United States Patent
Zaid et al.

(10) Patent No.: US 6,774,090 B2
(45) Date of Patent: Aug. 10, 2004

(54) COMPOSITIONS AND METHODS FOR CONTROLLING DOWNHOLE SULFIDE DEPOSITS

(75) Inventors: Gene H. Zaid, Sterling, KS (US); Beth Ann Wolf, Hutchinson, KS (US)

(73) Assignee: Jacam Chemicals, L.L.C., Sterling, KS (US)

(*) Notice: Subject to any disclaimer, the term of this patent is extended or adjusted under 35 U.S.C. 154(b) by 223 days.

(21) Appl. No.: 10/126,133

(22) Filed: Apr. 19, 2002

(65) Prior Publication Data

US 2003/0199397 A1 Oct. 23, 2003

(51) Int. Cl.⁷ .............................. C09K 3/00; E21B 21/00
(52) U.S. Cl. ....................... 507/237; 507/240; 507/256; 507/927; 507/932; 166/312
(58) Field of Search ................................ 507/237, 240, 507/256, 927, 932; 166/312

(56) References Cited

U.S. PATENT DOCUMENTS

| | | | | |
|---|---|---|---|---|
| 3,671,644 A | * | 6/1972 | Riyad et al. | 514/114 |
| 3,935,125 A | * | 1/1976 | Jacob | 422/15 |
| 4,409,121 A | * | 10/1983 | Latos et al. | 252/389.2 |
| 6,494,218 B1 | * | 12/2002 | Zaid et al. | 134/22.16 |
| 6,638,896 B1 | * | 10/2003 | Tibbles et al. | 507/201 |

\* cited by examiner

*Primary Examiner*—Philip C. Tucker
(74) *Attorney, Agent, or Firm*—Hovey Williams LLP

(57) ABSTRACT

Compositions and methods for treating systems, especially oil and/or gas wells, characterized by metal sulfide deposits are provided. Compositions according to the invention generally comprise a thioacid, an amine salt, and a diphosphonic acid. Methods according to the invention may comprise introducing such composition into a system characterized by metal sulfide deposits, or alternatively, introducing into the system individual quantities of the composition components.

63 Claims, No Drawings

COMPOSITIONS AND METHODS FOR CONTROLLING DOWNHOLE SULFIDE DEPOSITS

BACKGROUND OF THE INVENTION

1. Field of the Invention

This invention broadly concerns aqueous dispersions and methods for controlling sulfide deposits, especially downhole metal sulfide deposits associated with oil and/or gas wells. When introduced into a well, the aqueous dispersion reacts with the metal sulfide deposits and sequesters the metal ion. Through this process, downhole metal sulfide scaling is controlled.

2. Description of the Prior Art

The presence of downhole metal sulfide deposits, more specifically iron and zinc sulfides, is a serious problem encountered in certain oil well operations. These metal sulfides form a corrosive scale on the downhole equipment. If left untreated, the scale may corrode and destroy downhole equipment and lead to a stoppage in production.

The leading method of treating wells characterized by downhole metal sulfide deposits is through the use of acrylic aldehyde, also commonly known as acrolein. The acrolein data sheet distributed by the Agency for Toxic Substances and Disease Registry, Atlanta, Ga. is hereby incorporated by reference. Acrolein possesses numerous undesirable and hazardous qualities. Acrolein is an extremely reactive chemical and is sensitive to heat and light. It polymerizes violently, especially on contact with strong acids or bases. It is incompatible with amines, sulfur dioxide, metal salts and oxidants. It is for this reason that when treating a well with acrolein, the acrolein is pushed downhole with nitrogen gas.

Acrolein is poisonous to humans and must be handled with extreme caution. Acrolein fumes can cause severe eye and skin irritation and prolonged exposure can even result in death. Therefore protective clothing and a self-contained breathing apparatus are recommended equipment when working with acrolein.

In view of the foregoing problems associated with acrolein, there is a need in the art for a composition that effectively controls downhole metal sulfide deposits and is less volatile and less toxic than acrolein.

SUMMARY OF THE INVENTION

The present invention overcomes the problems associated with the use of acrolein, while at the same time provides effective compositions and methods for treating downhole metal sulfide deposits.

Compositions of the present invention are aqueous dispersions which generally comprise a thioacid, an amine salt, and a diphosphonic acid. It is preferable that the thioacid be selected from the group of acids having the formula R—SH, where R is a $C_2$–$C_{12}$ carboxylic acid moiety, and more preferably thioglycolic acid. The amine salt may comprise any primary, secondary, tertiary, or quaternary amine salt. Preferably the amine salt is quaternary and comprises an amine halide salt having the formula

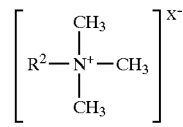

where $R^2$ is an aryl or aliphatic $C_1$–$C_{12}$ hydrocarbon moiety, and $X^-$ is a halide anion, preferably a chloride anion. Most preferably, $R^2$ is a benzyl moiety. It is most preferable that the salt comprise benzyl trimethyl quaternary ammonium chloride.

Preferably the diphosphonic acid will have the general formula

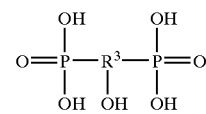

where $R^3$ is a $C_1$–$C_{12}$ alkyl moiety. Most preferably, the diphosphonic acid will comprise hydroxyethylidene diphosphonic acid (HEDP).

The thioacid is generally present at a level of from about 5–50% by weight, more preferably from about 10–35% by weight, and most preferably from about 20–30% by weight. All weight percentages disclosed herein, unless otherwise specified, are based upon the weight of the dispersion being 100%. The amine salt is generally present at a level of from about 1–25% by weight, more preferably from about 5–20% by weight, and most preferably from about 5–15% by weight. The quantity of diphosponic acid present in the dispersion ranges from about 1–25% by weight, more preferably from about 5–20% by weight, and most preferably from about 5–15% by weight.

The aqueous dispersion may also comprise various other inert compounds which impart desirable properties to the dispersion. Ethylene glycol is an example of such additional component which acts as a freezing point depressant. The amount of ethylene glycol to be used will depend upon the conditions under which the dispersion is being stored or used. However, it is preferable that the dispersion comprise between about 5–50% by weight ethylene glycol, more preferably between about 20–50% by weight, and most preferably between about 30–50% by weight.

The dispersion generally will comprise between about 5–50% by weight water, more preferably between about 10–40% by weight, and most preferably between about 10–20% by weight. Preferably, the dispersion will have a pH between about 1–5.

A preferred embodiment of the aqueous dispersion will comprise about 25% by weight thioglycolic acid, about 10% by weight of benzyl trimethyl quaternary ammonium chloride, about 10% by weight of HEDP, about 35% by weight water, and about 20% by weight ethylene glycol.

One preferred use of an aqueous dispersion according to the invention is in the treatment of systems, such as oil and/or gas wells, characterized by the presence of metal sulfides. These methods generally comprise the steps of providing an aqueous dispersion comprising a thioacid, an amine salt, and a diphosphonic acid, and introducing the dispersion into the system. In general, the aqueous dispersion for use with the methods of this invention may be any dispersion described above.

Methods of treating systems characterized by the presence of metal sulfides are useful in treating oil and/or gas wells characterized by the presence of downhole iron sulfide and zinc sulfide. During treatment, the aqueous dispersion will react with these downhole metal sulfide deposits thereby protecting the downhole equipment from the destructive effects of the scale.

It is also within the scope of the invention to provide a sulfide treatment wherein individual quantities of thioacid, amine salt and diphosphonic acid are separately introduced into the system. Preferred thioacid, amine salt, and diphosphonic acid ingredients are the same as those previously discussed.

It is preferable that the individual quantity of thioacid introduced into the system be between about 5–50% by weight, more preferably between 10–35% by weight, and most preferably between 20–30% by weight based on the total weight of all thioacid, amine salt, and diphosphonic acid introduced into the system. It is preferable that the individual quantity of amine salt introduced into the system be between about 1–25% by weight, more preferably between 5–20% by weight, and most preferably between 5–15% by weight based on the total weight of all thioacid, amine salt, and diphosphonic acid introduced into the system. Finally, it is preferable that the individual quantity of diphosphonic acid introduced into the system be between about 1–25% by weight, more preferably between 5–20% by weight, and most preferably between 5–15% by weight based on the total weight of all thioacid, amine salt, and diphosphonic acid introduced into the system.

It is also possible to introduce into the system individual quantities of inert compounds. For example, ethylene glycol may be introduced into the system at a level of between 5–50% by weight, more preferably between 20–50% by weight, and most preferably between 30–50% by weight based on the total weight of all thioacid, amine salt, diphosphonic acid, and ethylene glycol introduced into the system. Individual quantities of water may also be introduced into the system at a level of between 5–50% by weight, more preferably between 10–40% by weight, and most preferably between 10–20% by weight based on the total weight of all thioacid, amine salt, diphosphonic acid, and water introduced into the system.

The individual quantities of the above-named components may be particularly useful for introduction into systems such as oil and/or gas wells for the treatment of downhole iron sulfide and zinc sulfide deposits. When introduced into the well, the thioacid, amine salt, and phosphonic acid act upon the downhole metal sulfide deposits thereby sequestering the metal ion.

DETAILED DESCRIPTION OF THE PREFERRED EMBODIMENTS

EXAMPLE

The following example describes preferred compositions and methods in accordance with the invention. It is to be understood that this example is an illustration only and nothing therein should be deemed as a limitation upon the overall scope of the invention.

An oil well characterized by the presence of downhole metal sulfide deposits, and more particularly, zinc sulfide, was treated with an aqueous dispersion prepared according to the invention. The dispersion comprised about 25% by weight thioglycolic acid, about 10% by weight of an amine chloride salt having the formula

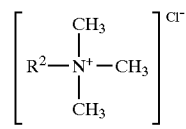

where $R^2$ was a benzyl moiety, about 10% by weight HEDP, also known as Unihib 106 obtained from Lonza, Inc. (Fairlawn, N.J.), about 35% by weight water, and about 20% by weight ethylene glycol as a freezing point suppressant. The dispersion was a clear, colorless liquid and had a pH of about 1.

The well was treated with approximately 1–2 gallons of the aqueous dispersion daily. The treatment process consisted of simply introducing the dispersion into the well bore. Over the course of about two months, the zinc concentration of the water produced from the well was monitored. These results are shown in Table 1. The initial zinc concentration of the well production water is that at elapsed time equals zero.

TABLE 1

| Elapsed Time (days) | Zinc Concentration (mg/l) |
| --- | --- |
| 0 | 42 |
| 2 | 42 |
| 4 | 38 |
| 9 | 40 |
| 11 | 40 |
| 14 | 78 |
| 20 | 78 |
| 50 | 80 |
| 57 | 100 |
| 60 | 120 |
| 63 | 100 |

The data shows that within two weeks of treatment, the concentration of zinc in the production water almost doubled, and within about two months of treatment, the concentration almost tripled. This data demonstrates that the aqueous dispersion broke down the metal sulfide deposits and sequestered the metal ions, thereby allowing the well production fluids to transport the metal ions to the surface.

Similar results are also obtained upon introducing the aqueous dispersion into a well characterized by the presence of iron sulfide deposits. The aqueous dispersion acts upon the iron sulfide deposits, breaking them down and sequestering the iron ions. The well production fluids then transport the metal ions to the surface.

We claim:

1. An aqueous dispersion comprising a thioacid, an amine salt, and a diphosphonic acid.

2. The dispersion of claim 1, said thioacid selected from the group of acids having the formula $R^1$—SH, where $R^1$ comprises at least one $C_2$–$C_{12}$ carboxylic acid moiety.

3. The dispersion of claim 2, said thioacid being thioglycolic acid.

4. The dispersion of claim 1, said thioacid being present at a level of from about 5–50% by weight based on the weight of the dispersion being 100%.

5. The dispersion of claim 1, said amine salt being present at a level of from about 1–25% by weight based on the weight of the dispersion being 100%.

6. The dispersion of claim 1, said diphosphonic acid being present at a level of from about 1–25% by weight based on the weight of the dispersion being 100%.

7. The dispersion of claim 1 further comprising between about 5–50% ethylene glycol by weight based on the weight of the dispersion being 100%.

8. The dispersion of claim 1, said dispersion comprising between about 5–50% water by weight based on the weight of the dispersion being 100%.

9. The dispersion of claim 1, said dispersion having a pH of from about 1–5.

10. The dispersion of claim 1, said diphosphonic acid having the formula

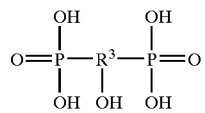

where $R^3$ is a $C_1$–$C_{12}$ alkyl moiety.

11. The dispersion of claim 10, wherein said diphosphonic acid is hydroxyethylidene diphosphonic acid (HEDP).

12. An aqueous dispersion comprising:
a thioacid;
an amine halide salt having the formula:

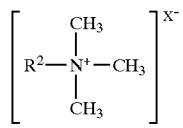

where $R^2$ is an aryl or aliphatic $C_1$–$C_{12}$ alkyl moiety and $X^-$ is a halide anion; and diphosphonic acid.

13. The dispersion of claim 12, said thioacid selected from the group of acids having the formula $R^1$—SH, where $R^1$ comprises at least one $C_2$–$C_{12}$ carboxylic acid moiety.

14. The dispersion of claim 13, said thioacid being thioglycolic acid.

15. The dispersion of claim 12 wherein $R^2$ is an aryl moiety.

16. The dispersion of claim 12, said thioacid being present at a level of from about 5–50% by weight based on the weight of the dispersion being 100%.

17. The dispersion of claim 12, said amine salt being present at a level of from about 1–25% by weight based on the weight of the dispersion being 100%.

18. The dispersion of claim 12, said diphosphonic acid being present at a level of from about 1–25% by weight based on the weight of the dispersion being 100%.

19. The dispersion of claim 12, further comprising between about 5–50% ethylene glycol by weight based on the weight of the dispersion being 100%.

20. The dispersion of claim 12, said dispersion containing between about 5–50% water by weight based on the weight of the dispersion being 100%.

21. The dispersion of claim 12, said dispersion having a pH of from about 1–5.

22. The dispersion of claim 12, said diphosphonic acid having the formula

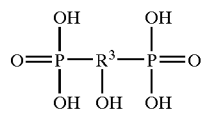

where $R^3$ is a $C_1$–$C_{12}$ alkyl moiety.

23. The dispersion of claim 22, wherein said diphosphonic acid is hydroxyethylidene diphosphonic acid (HEDP).

24. An aqueous dispersion comprising:
a thioacid selected from the group of acids having the formula $R^1$—SH, where $R^1$ comprises at least one $C_2$–$C_{12}$ carboxylic acid moiety;
an amine halide salt having the formula:

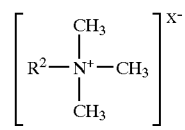

where X is a halide anion and $R^2$ is an aryl or aliphatic $C_1$–$C_{12}$ alkyl moiety; and a diphosphonic acid having the formula

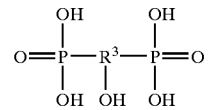

where $R^3$ is a $C_1$–$C_{12}$ alkyl moiety.

25. The dispersion of claim 24, said thioacid being thioglycolic acid.

26. The dispersion of claim 24, said thioglycolic acid being present at a level of from about 5–50% by weight based on the weight of the dispersion being 100%.

27. The dispersion of claim 24, said amine salt being present at a level of from about 1–25% by weight based on the weight of the dispersion being 100%.

28. The dispersion of claim 24, said diphosphonic acid being present at a level of from about 1–25% by weight based on the weight of the dispersion being 100%.

29. The dispersion of claim 24 further comprising between about 5–50% ethylene glycol by weight based on the weight of the dispersion being 100%.

30. The dispersion of claim 24, said dispersion containing between about 5–50% water by weight based on the weight of the dispersion being 100%.

31. The dispersion of claim 24, said dispersion having a pH of from about 1–5.

32. The dispersion of claim 24, wherein said diphosphonic acid is hydroxyethylidene diphosphonic acid (HEDP).

33. A method of treating a system characterized by the presence of metal sulfides comprising the steps of:

providing an aqueous dispersion comprising a thioacid, an amine salt and diphosphonic acid; and
introducing said dispersion into said system.

34. The method of claim 33, said thioacid being selected from the group of acids having the formula $R^1$—SH, where $R^1$ comprises at least one $C_2$–$C_{12}$ carboxylic acid moiety.

35. The method of claim 34, said acid being thioglycolic acid.

36. The method of claim 33, said amine salt comprising an amine halide salt having the formula:

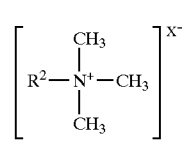

where X is a halide anion and $R^2$ is an aryl or aliphatic $C_1$–$C_{12}$ alkyl moiety.

37. The method of claim 33, said diphosphonic acid having the formula

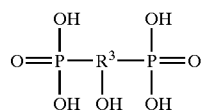

where $R^3$ is a $C_1$–$C_{12}$ alkyl moiety.

38. The method of claim 37, wherein said diphosphonic acid is hydroxyethylidene diphosphonic acid (HEDP).

39. The method of claim 36 wherein $R^2$ is an aryl moiety.

40. The method of claim 33, said thioacid being present at a level of from about 5–50% by weight based on the weight of the dispersion being 100%.

41. The method of claim 33, said amine salt being present at a level of from about 1–25% by weight based on the weight of the dispersion being 100%.

42. The method of claim 33, said diphosphonic acid being present at a level of from about 1–25% by weight based on the weight of the dispersion being 100%.

43. The method of claim 33, said dispersion further comprising between about 5–50% ethylene glycol by weight based on the weight of the dispersion being 100%.

44. The method of claim 33, said dispersion further comprising between about 5–50% water by weight based on the weight of the dispersion being 100%.

45. The method of claim 33, said dispersion having a pH of from about 1–5.

46. The method of claim 33, said system being an oil and/or gas well.

47. The method of claim 46, said dispersion reacting with downhole metal sulfide deposits.

48. The method of claim 47, said metal sulfide deposits being selected from the group consisting of iron sulfide and zinc sulfide.

49. A method of treating a system characterized by the presence of metal sulfides comprising introducing into said system individual quantities of a thioacid, an amine salt and diphosphonic acid.

50. The method of claim 49, said thioacid being selected from the group of acids having the formula $R^1$—SH, where $R^1$ comprises at least one $C_2$–$C_{12}$ carboxylic acid moiety.

51. The method of claim 50, said acid being thioglycolic acid.

52. The method of claim 49, said amine salt comprising an amine halide salt having the formula:

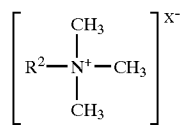

where X is a halide anion and $R^2$ is an aryl or aliphatic $C_1$–$C_{12}$ alkyl moiety.

53. The method of claim 49, said diphosphonic acid having the formula

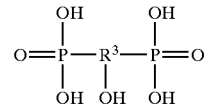

where $R^3$ is a $C_1$–$C_{12}$ alkyl moiety.

54. The method of claim 53, wherein said diphosphonic acid is hydroxyethyladine diphosphonic acid (HEDP).

55. The method of claim 52, wherein $R^2$ is an aryl moiety.

56. The method of claim 49, said thioacid being introduced at a level of from about 5–50% by weight based on the total weight of all thioacid, amine salt, and diphosphonic acid introduced into said system.

57. The method of claim 49, said amine salt being introduced at a level of from about 1–25% by weight based on the total weight of all thioacid, amine salt, and diphosphonic acid introduced into said system.

58. The method of claim 49, said diphosphonic acid being introduced at a level of from about 1–25% by weight based on the total weight of all thioacid, amine salt, and diphosphonic acid introduced into said system.

59. The method of claim 49, said method including introducing into said system an individual quantity of ethylene glycol between about 5–50% by weight based on the total weight of all thioacid, amine salt, diphosphonic acid, and ethylene glycol introduced into said system.

60. The method of claim 49, said method including introducing into said system an individual quantity of water between about 5–50% water by weight based on the total weight of all thioacid, amine salt, diphosphonic acid, and water introduced into said system.

61. The method of claim 49, said system being an oil and/or gas well.

62. The method of claim 61, said thioacid, amine salt, and diphosphonic acid acting upon downhole metal sulfide deposits.

63. The method of claim 62, said metal sulfide deposits being selected from the group consisting of iron sulfide and zinc sulfide.

* * * * *